(12) United States Patent
Courtemanche

(10) Patent No.: US 6,494,548 B2
(45) Date of Patent: Dec. 17, 2002

(54) SNOWMOBILE TRACK BELT

(75) Inventor: Denis Courtemanche, Richmond (CA)

(73) Assignee: Camoplast Inc., Sherbrooke (CA)

( * ) Notice: Subject to any disclaimer, the term of this patent is extended or adjusted under 35 U.S.C. 154(b) by 0 days.

(21) Appl. No.: 09/816,837

(22) Filed: Mar. 23, 2001

(65) Prior Publication Data

US 2001/0030467 A1 Oct. 18, 2001

(30) Foreign Application Priority Data

Apr. 13, 2000 (CA) ............................................. 2305924

(51) Int. Cl.[7] ................................................ B62D 55/24
(52) U.S. Cl. ........................................ 305/168; 305/167
(58) Field of Search .............................. 305/168, 165, 305/120, 121, 122, 178, 167

(56) References Cited

U.S. PATENT DOCUMENTS

| | | | |
|---|---|---|---|
| 3,781,067 A | * 12/1973 | Dodson et al. ............. 305/165 |
| 3,887,243 A | 6/1975 | Chaumont | |
| 3,934,944 A | * 1/1976 | Forsgren ..................... 305/165 |
| 4,036,320 A | * 7/1977 | Rabehl ........................ 305/165 |
| 4,546,842 A | * 10/1985 | Yasui ......................... 305/165 |
| 5,474,146 A | * 12/1995 | Yoshioka et al. ........... 305/165 |
| 5,709,440 A | * 1/1998 | Lecours ...................... 305/165 |
| 5,755,495 A | * 5/1998 | Cook et al. ................. 305/122 |
| 6,000,766 A | * 12/1999 | Takeuchi et al. ............ 305/178 |
| 6,354,677 B1 | * 3/2002 | Cook et al. ................. 301/122 |

* cited by examiner

Primary Examiner—Long Nguyen
(74) Attorney, Agent, or Firm—Merchant & Gould P.C.

(57) ABSTRACT

The invention relates to a snowmobile endless track belt of the type having a body made of an elastomeric material, an outer surface for contact with the ground and an inner surface provided with lugs for engagement with the snowmobile driving system and with at least one endless pathway that contacts a corresponding slide rail of the snowmobile suspension. The elastomeric material, in at least the area which is contacted by the slide rail, is composed of rubber and of a lubricating material so that friction generated between the slide rail and a driven belt is greatly reduced by the presence of such lubricating material in the elastomeric material.

6 Claims, 2 Drawing Sheets

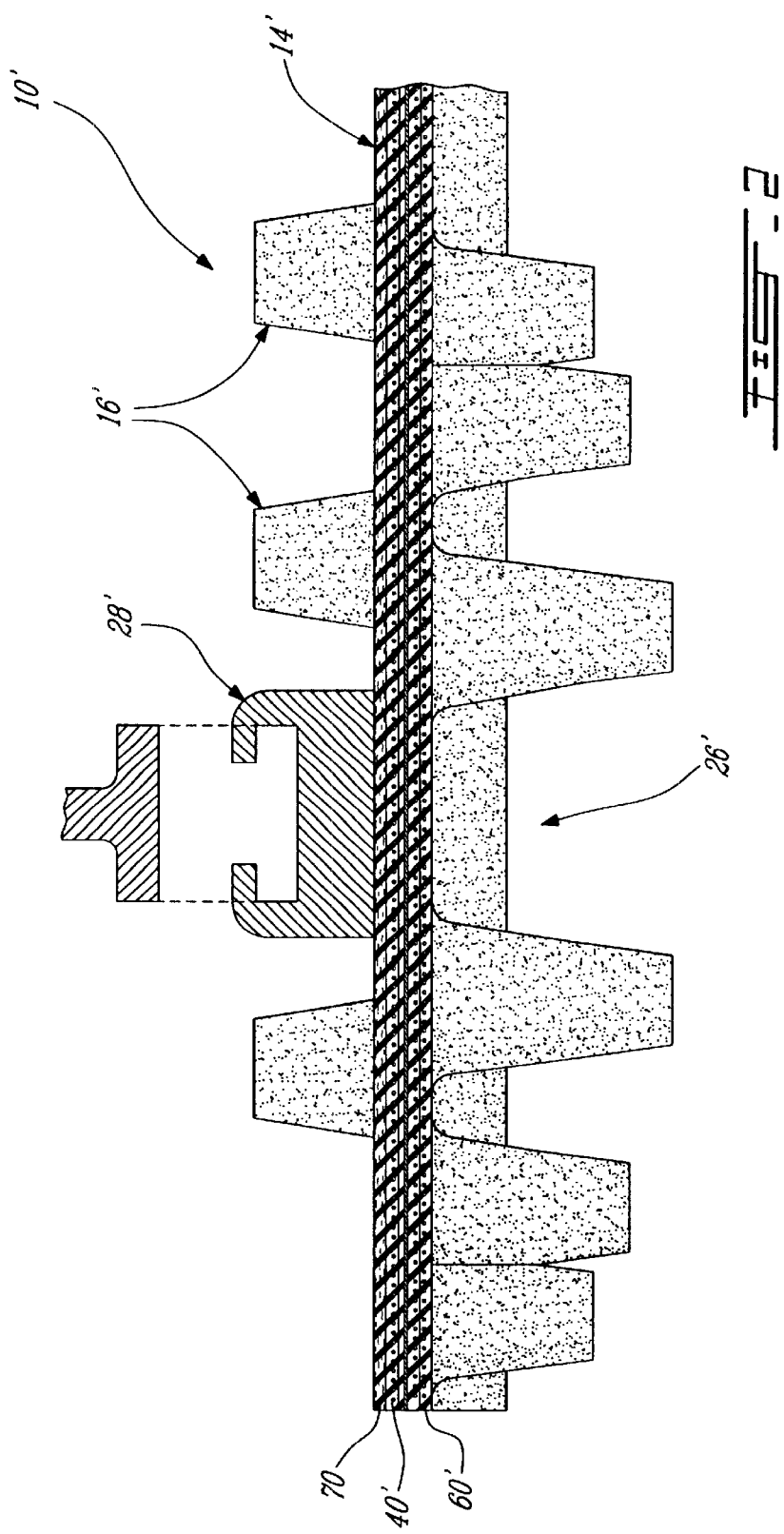

SNOWMOBILE TRACK BELT

FIELD OF THE INVENTION

The present invention relates to a belt for a track-driven vehicle, such as a snowmobile.

DESCRIPTION OF THE PRIOR ART

Track belts provided on motor driven vehicles, such as snowmobiles, usually comprise a body made of elastomeric material. This body has an outer surface which contacts the ground and an inner surface which cooperates with a slide suspension system and a driving system. Generally, the body is driven by one of several driving wheels, such as sprocket wheels, which engage openings or driving lugs provided on the inner surface of the track belt. The slide suspension system is designed for supporting the chassis of the vehicle and usually comprises a pair of parallel slide rails contacting the inner surface of the track belt. Such rails also support the track belt with respect to lateral movements.

Formerly, each slide rail of a slide suspension system was aligned with a corresponding row of openings designed for engagement with teeth of a corresponding sprocket wheel. Such positioning of the slide rails reduces the portion of the inner surface of the track belt that is in contact with the slide rails and thus the amount of friction therebetween. It was found that, eventhough the friction was reduced, failures and rapid wear of the track belt and slide rails were still observed. To overcome this drawback, in U.S. Pat. No. 3,887,243 (Chaumont), the portions of the inner surface contacting the slide rails were provided with metal clips to reduce friction occurring between the inner surface of the body and the slide rails. It is also well known in the prior art that, in order to minimize friction between the inner surface of the track belt and the slide rails and also to facilitate the positioning of the clips, the slide rails were positioned above a corresponding pathway of clips essentially separated from each other by a hole.

It is also known in the art that, to maintain a sufficient sturdiness of the track belt, it is advantageous to have a maximum amount of clips. However, this increases the weight of the track belt. Therefore, there is a strong need for a track belt that does not have the drawback of those of the prior art with respect to friction existing between the inner surface of the track belt and the slide rails while reducing the whole weight of the track belt.

Therefore, the prior art teaches to the man skilled in the art that slide rails must contact a maximum of frictionless clips and a minimum of the inner surface of the track belt.

OBJECTS AND STATEMENT OF THE INVENTION

An object of the invention is to embody a track belt for motor vehicles, such as snowmobiles, having to cooperate with slide rails of a slide suspension system, which shows at once high characteristics of strength, resistance and durability, avoids friction between its inner surface and the slide rails and has a reduced weight with respect to track belts already known in the art.

Another object of the present invention is to enable the formation of a lubricating effect between the slide rails and the inner surface of the track belt in order to achieve this friction reduction.

Another object of the invention concerns a method for making a snowmobile track with a view to minimizing friction between the slide rails and the corresponding inner surface of the track belt.

However, contrary to the teachings of the prior art, the applicant has surprisingly found that it is possible to have a substantial portion of the inner surface in contact with slide rails, while still limiting the friction existing between them. More particularly, the applicant has discovered an improvement in an endless track belt of the type comprising a body made of an elastomeric material, the body having an outer surface for contact with the ground and an inner surface provided with means for engagement with driving means. The inner surface is also provided with at least one endless pathway having a sliding surface contacting a corresponding slide rail of a slide rail suspension. The elastomeric material of the track belt is composed of rubber and a lubrication means so that, at the sliding contact of the inner surface of the track belt, friction is greatly reduced due to the presence of such lubrication.

In one preferred form of the invention, this composition of rubber material and lubricating means is provided only in the endless pathway of the track which contacts the slide rail of the sliding rail suspension.

In another form of the invention, the complete inner surface of the track belt is composed of a layer of rubber and lubricating means.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is a cross-sectional view of another embodiment of a track belt made in accordance with the present invention.

DESCRIPTION OF PREFERRED EMBODIMENTS

Figure 1:
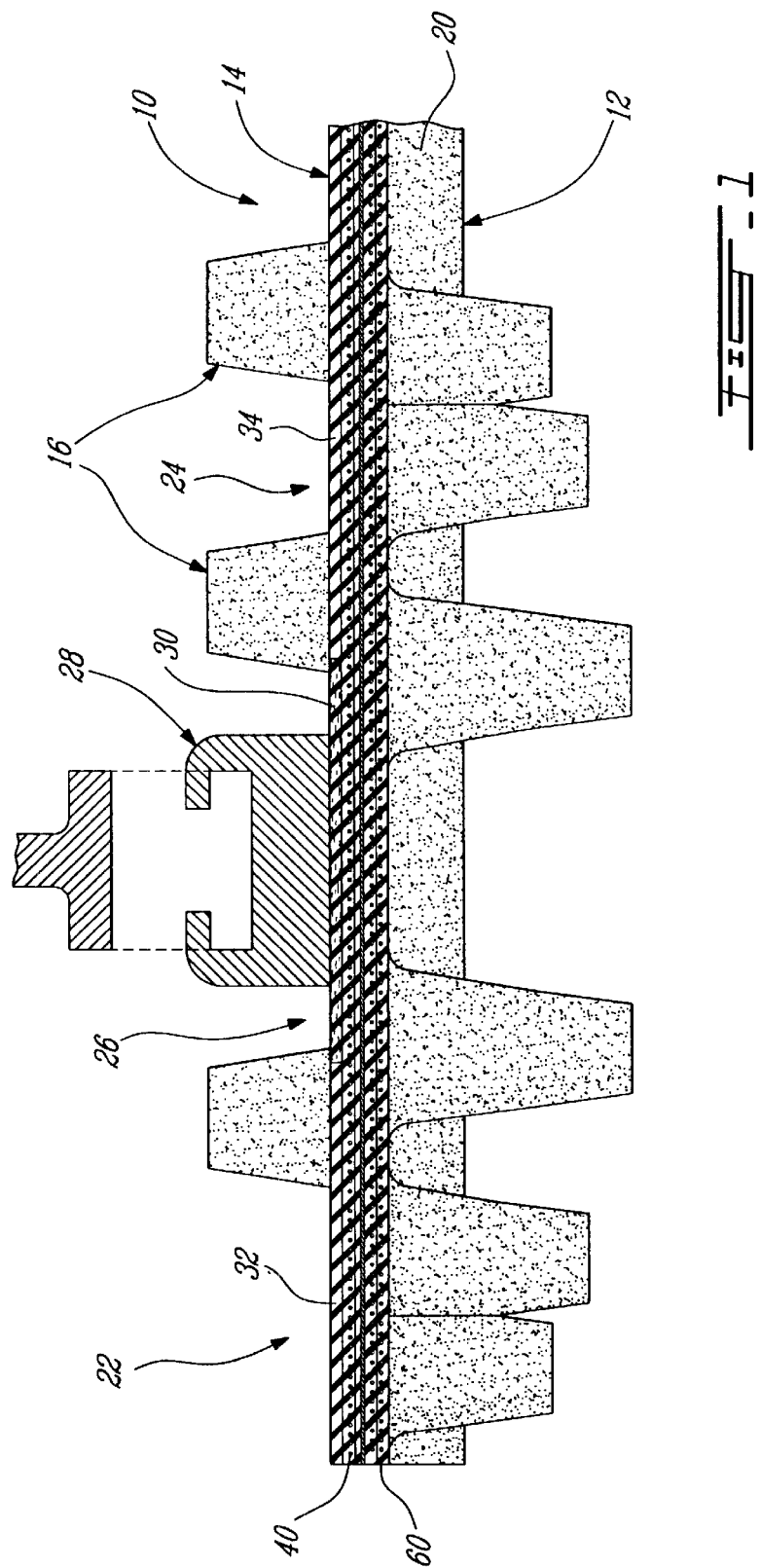
FIG. 1 is a cross-sectional view of one embodiment of a track belt made in accordance with the present invention.

Referring to FIG. 1, there is shown a cross-sectional view of part of a snowmobile track belt 10 comprising an outer surface 12 and an inner surface 14, the latter being provided with integrally formed lugs 16 which are drivingly engageable by driven sprockets (not shown) on the snowmobile.

The track is made of rubber as its main component; but, in most cases it includes a plurality of layers of reinforcing woven fabric. The track is also reinforced by means of a plurality of rods extending transversely of the track and embedded in the rubber material in areas such as 20. In most cases, the track consists of a pair of opposite lateral sections, one being shown as 22, and an intermediate central portion 24, the three sections being separated from one another by means of a part of pathways, one being shown as 26, which may include a series of longitudinally spaced openings; however, these openings can be completely filled. This pathway 26, on the inner surface 14 of the track belt, serves to receive the lower face of a slide rail 28 which forms part of the suspension system of the snowmobile (in most cases, there are two slide rails per suspension). In those snowmobile tracks that do not have lugs 16, the driving of the track is achieved by means of sprockets having peripheral lugs that are received in a series of longitudinally spaced openings provided in the pathway 26.

The slide rail 28 is preferably made of low friction material. This material is usually a plastic material, such as ultra high molecular weight polyethylene. Structural details by which the slide rails are mechanically fastened to the remain of the suspension system have been voluntarily omitted for clarification purposes. Those characteristics are of course well known in the art and do not need any extensive description.

The conventional way of making a snowmobile track is to place a layer of rubber and woven fabrics on the inner mold of a press, placing a series of transverse rods at peripheral intervals over this first layer, laying additional layers of rubber and woven fabrics thereover, closing an outer mold of the press over these layers, and then vulcanizing the rubber so that the track is molded with the rods embedded in the rubber and fabrics body. Once the rubber is cured, the outer mold is distanced radially from the inner mold, the track is removed from the inner mold and, in cases where the track to be formed is provided with a series of sprocket engaging holes, it is brought to another station where these holes are punched out of the track. Then, metallic clips are positioned adjacent these holes to provide this sliding contact existing in prior art tracks as explained above.

The present invention is concerned with reducing the friction that exists between the slide rail 28 and the inner surface 30 of the track when driven at high speed.

In the case of the track illustrated in FIG. 1, the cross section of the layer of material at track section 26 is represented as being different from that of the remaining track sections 32 and 34. At 30 the layer of elastomeric material consists of a composition of rubber and of a lubrication means. One example of such composition which has never been used in the snowmobile industry is the one sold on the market by Advanced Rubber Compounding Limited under series number 5482-s or 5483.

In making the snowmobile track illustrated in FIG. 1, a mold press consisting of a stationary inner mold and a movable outer mold is prepared. Then, a layer in the form of band consisting of the composition of rubber and lubricating means in accordance with the present invention is placed at a given area on the mold; for track suspension using two slide rails, two layers 30 are laterally placed on the inner mold at these areas such as 26. Then, layers 32 and 34 of rubber and woven fabrics are laid in the remaining areas 22 and 24. A series of reinforcing rods are laid over the layers 30, 32 and 34 and then additional layers of fabrics and rubber 40 and 60 are placed thereover. Then, the outer mold of the press which consists of a series of peripheral segments is radially moved towards the inner mold with the layers thereon. The construction of such mold press is well known in the art and will not be described in detail; they include means for vulcanizing the rubber material once the radially moved segments are moved in contact with the track components on the inner mold. The vulcanizing process results in the making of an integral body of all the components. Once cured, the outer mold is retracked and the formed track is removed.

Referring to FIG. 2, a second embodiment 10' of a track made in accordance with the present invention is shown again partly in cross section. The only difference existing between the embodiments of FIG. 1 and FIG. 2 is that the inner surface 14' extends the entire width of the track; hence, it is not, as is the case in track 10 of FIG. 1, present only in those areas which are to be contacted by the slide rails 20'.

All the components of the track 10' shown in FIG. 2 bear the same reference numerals as in the FIG. 1 with the exception of a prime mark and with the further exception that the inner surface 14' has a layer 70 with a width corresponding substantially to the width of the inner mold of the press, (and consequently of the track). Therefore, once this layer of rubber and lubricating means is placed on the inner mold, the other steps involved in the making of the snowmobile track are the same as that described above with respect to the embodiment illustrated in FIG. 1.

Although the invention has been described above with respect to two specific embodiments, it will be evident to a person skilled in the art that it may be modified and refined in various ways. It is therefore wished to have it understood that the present invention should not be limited in scope, except by the terms of the following claims.

What is claimed is:

1. In an endless track belt for vehicles moving mainly on snow surfaces, said track belt comprising a body made of an elastomeric material; said body having an outer surface for contact with the snow surface and an inner surface provided with means for engagement with driving means and at least one endless pathway having a sliding surface contacting a corresponding slide rail of a vehicle rail suspension; said elastomeric material being formed, in at least the area of said inner surface contacted by the slide rail, of a layer of a composition of rubber and lubricating means so that friction between the slide rail and the endless driving track, when driven, is reduced due to the presence of said lubrication means at said sliding surface.

2. An endless track belt according to claim 1, wherein said composition layer of rubber and lubrication means is provided in only those areas of the track belt that come in contact with the slide rails.

3. An endless track belt as defined in claim 1, wherein the entire inner surface of the track belt is formed of said composition layer of rubber and lubrication means.

4. A method of making a molded track for use with a snowmobile having a suspension system equipped with slide rails comprising:

preparing a mold press consisting of a stationary inner mold and a movable outer mold;

laying a first layer of a composition consisting of rubber and lubrication means on said inner mold;

laying layers of rubber and fabrics adjacent to and/or on said first layer; and vulcanizing said first layer and said layers of rubber and fabrics to form a molded track whereby said first layer defines at least an endless sliding pathway of the track to come in contact with the slide rails of the slide rail suspension.

5. A method of making a molded track for use with a snowmobile comprising:

placing first layers of a composition of rubber and lubrication means on a stationary inner mold;

placing first layers of rubber and fabrics on said inner mold in areas other than taken by said first composition layers;

placing a series of reinforcing rods transversely of said first layers of rubber and fabrics and said first layers of composition of rubber and lubrication means at predetermined longitudinal spacings along said inner mold;

placing additional layers of rubber and fabrics over all said first layers and over said rods;

pressing a movable outer mold onto said assembly; and vulcanizing said rubber to form a molded track having, on an inner surface thereof, endless pathways of rubber and lubrication means to provide frictionless sliding surfaces between said slide rails and said track.

6. In an endless track belt for vehicles moving mainly on snow surfaces, said track belt comprising a body made of an elastomeric material; said body having an outer surface for contact with the snow surface and an inner surface provided with means for engagement with driving means and at least one endless pathway having a sliding surface contacting a corresponding slide rail of a vehicle rail suspension; said elastomeric material being formed on the entire inner surface of the track belt, of a layer of a composition of rubber and lubricating means so that friction between the slide rail and the endless driving track, when driven, is reduced due to the presence of said lubrication means at said sliding surface.

* * * * *